United States Patent
Kijlstra et al.

(10) Patent No.: US 10,653,132 B2
(45) Date of Patent: May 19, 2020

(54) FORMULATIONS COMPRISING VOLATILE INSECTICIDES WITH IMPROVED LONG-TERM STABILITY AND ACTIVITY

(71) Applicant: Bayer CropScience Aktiengesellschaft, Monheim am Rhein (DE)

(72) Inventors: Johan Kijlstra, Odenthal (DE); Stephan Schuele, Hilden (DE)

(73) Assignee: Bayer CropScience Aktiengesellschaft, Monheim am Rhein (DE)

( * ) Notice: Subject to any disclaimer, the term of this patent is extended or adjusted under 35 U.S.C. 154(b) by 0 days.

(21) Appl. No.: 16/303,213

(22) PCT Filed: May 17, 2017

(86) PCT No.: PCT/EP2017/061825
§ 371 (c)(1),
(2) Date: Nov. 20, 2018

(87) PCT Pub. No.: WO2017/202663
PCT Pub. Date: Nov. 30, 2017

(65) Prior Publication Data
US 2019/0200606 A1    Jul. 4, 2019

(30) Foreign Application Priority Data
May 24, 2016 (EP) .................. 16170950

(51) Int. Cl.
A01N 53/00 (2006.01)
A01N 25/04 (2006.01)
A01N 25/10 (2006.01)
A01N 25/22 (2006.01)

(52) U.S. Cl.
CPC ............ *A01N 25/04* (2013.01); *A01N 25/22* (2013.01); *A01N 53/00* (2013.01)

(58) Field of Classification Search
None
See application file for complete search history.

(56) References Cited

U.S. PATENT DOCUMENTS

| 8,815,269 B2 | 8/2014 | Kijlstra et al. |
| 9,044,011 B2 | 6/2015 | Reid et al. |
| 9,078,433 B2 | 7/2015 | Kijlstra et al. |
| 2011/0071228 A1 | 3/2011 | Kijlstra et al. |
| 2013/0338223 A1 | 12/2013 | Reid et al. |
| 2014/0336255 A1 | 11/2014 | Kijlstra et al. |

FOREIGN PATENT DOCUMENTS

| DE | 2357826 A1 | 5/1974 |
| JP | S5953401 A | 5/1984 |
| WO | 9203048 A1 | 3/1992 |
| WO | 2009141109 A2 | 11/2009 |
| WO | 2012003060 A1 | 1/2012 |

OTHER PUBLICATIONS

Saenger, W., "Cyclodextrin Inclusion Compounds in Research and Industry," Angewandte Chemie International Edition, Wiley—V CH Verlag GMBH & Co. KGAA, DE, vol. 19, Jan. 1, 1980, pp. 344-362, XP001121152.
Szejtli, J., "Cyclodextrins in Pesticides," Starch: International Journal for the Investigation, Processing and Use of Carbohydrates and Their Derivatives, Wiley-VCH Verlag, Weinheim, DE, vol. 37, No. 11, Jan. 1, 1985, pp. 382-386, XP002576818.
Bergamasco, Rita De Cássia et al., "Sulfluramid Volatility Reduction by [beta]-Cyclodextrin," Journal of Agricultural and Food Chemistry, vol. 53, No. 4, Feb. 1, 2005, pp. 1139-1143, XP055280266.
Szente, Lajos et al., "Formulation of Insect Controlling Agents With B-Cyclodextrin," Pesticide Science, Elsevier Applied Science Publisher. Barking, GB, vol. 28, No. 1, Jan. 1, 1990, pp. 7-16, XP000133136.
XP002758731, Database WPI Week 198419, Thomson Scientific, London, GB; AN 1984-116602.
International Search Report of International Patent Application No. PCT/EP2017/061825 dated Jun. 21, 2017.
European Search Report of European Patent Application No. EP16170950 dated Jun. 15, 2016.

*Primary Examiner* — Kyung S Chang
(74) *Attorney, Agent, or Firm* — McBee Moore & Vanik IP, LLC

(57) ABSTRACT

The present invention relates to aqueous compositions with volatile insecticides which have an improved long-term stability and are therefore also biologically active over a prolonged period. A further subject matter of the invention relates to the use of such formulations for the long-term control of animal pests (arthropods) on various surfaces.

20 Claims, No Drawings

FORMULATIONS COMPRISING VOLATILE INSECTICIDES WITH IMPROVED LONG-TERM STABILITY AND ACTIVITY

CROSS REFERENCE TO RELATED APPLICATIONS

This application is a National Stage entry of International Application No. PCT/EP2017/061825 filed 17 May 2017, which claims priority to European Patent Application No. 16170950.6, filed 24 May 2016.

BACKGROUND

The present invention relates to aqueous compositions with volatile insecticides which have an improved long-term stability and are therefore also biologically active over a prolonged period. A further subject matter of the invention relates to the use of such formulations for the long-term control of animal pests (arthropods) on various surfaces.

DESCRIPTION OF RELATED ART

Controlling arthropods inside and outside buildings and houses is required for a variety of reasons. In countries in which diseases are transmitted by arthropods such as insects or arachmids to animals and humans, for example malaria, there is a great need for protecting the inhabitants in an efficient and long-term manner. Moreover, reasons of hygiene and structural engineering require that animal pests be prevented from entering into buildings, spreading and dwelling in buildings and infesting wood or other materials. This is why a multiplicity of control products and methods has already been developed. The most frequently used control method is the application of insecticidal active substances in aqueous spray or atomizing solutions.

Some of the insecticides employed, such as, for example, some active substances from the class of the pyrethroids, have the disadvantage that, owing to chemico-physical parameters, they tend to dissipate relatively quickly from a formulation, which, accordingly, counteracts the aim of achieving a long-term biological activity of the formulation on a sprayed surface.

Independently of the active substance used, the activity of the spray coating also depends greatly on the chemico-physical properties of the sprayed surface. The duration of action of the spray coating is greatly affected and reduced in particular on porous and in particular alkaline porous surfaces. This results in short long-term activities for example when controlling malaria mosquitoes inside buildings.

When controlling pests outside the house, it is the house walls, the soil, plants, shrubs and lawn areas that are treated. Here, it is not only the surface properties (porosity, pH), but additionally the effects of temperature, UV and rain which result in the rapid loss of activity of the active substances employed.

There is a continuous demand for improving the activity of the products under these conditions. A longer-term protection can reduce the exposure of the user, the inhabitants, the domestic animals and the environment to a minimum because active substance needs to be applied less frequently.

SUMMARY

The object on which the present invention is based was therefore the provision of novel, improved insecticidal compositions which offer long-term protection from insects when they are applied to surfaces. It is intended that the compositions be particularly suitable in connection with using volatile insecticides. In addition, it is desirable that the compositions according to the invention have advantageous properties in respect of various environmental factors such as high/low/changing temperatures, UV radiation and rain.

The object(s) is/are achieved by the aqueous compositions according to the invention, comprising
  at least one insecticide which has a vapour pressure of at least 0.001 mPa at 20° C.,
  at least one cyclodextrin and
  at least one polymer dispersion and
  water,
the ratio of the amounts by weight of the at least one polymer dispersion to the at least one cyclodextrin being between 0.4:1 and 10:1, in each case based on the solids content.

DETAILED DESCRIPTION OF A PREFERRED EMBODIMENT

Aqueous compositions according to the invention are simple to handle and inexpensive to prepare. Aqueous compositions according to the invention may exist for example as ready-to-use formulations (RTU), but also as concentrates (which are diluted in water upon application).

Surprisingly, it has been found that the compositions according to the invention, after being applied to a surface, show an improved biological long-term activity in comparison with the prior art. This applies in particular to the treatment of non-porous surfaces.

Furthermore, it has surprisingly been found that the durability of the coatings obtained by using the aqueous composition according to the invention is markedly better than that of previously known coatings, even under the effect of high/low/changing temperatures, rain and UV radiation.

A further advantage of the compositions according to the invention is an outstanding chemical stability combined with very good stabilization against creaming, sedimentation and/or precipitations. Thus, a correct application is possible without a previous homogenization of the formulation or spray mixture being required.

The compositions according to the invention are suitable both for internal and external applications, are tolerated by plants and are advantageous in as far as they are good value for money.

It is preferred to employ at least one insecticide selected from the group consisting of esbiothrin, lambda-cyhalothrin, D-allethrin, S-bioallethrin, prallethrin, pyrethrum and an insecticide which has a polyfluorobenzyl substituent for the aqueous compositions according to the invention. It is even more preferred to employ an insecticide which has a polyfluorobenzyl substituent. The latter are preferably selected from the group consisting of transfluthrin, metofluthrin, momfluorothrin, meperfluthrin, dimefluthrin, fenfluthrin, profluthrin, tefluthrin and heptafluthrin. The use of transfluthrin is very especially preferred.

Besides the abovementioned insecticides, compositions according to the invention may comprise further insecticidal active substances.

The formulation described preferably comprises additionally at least one emulsifier. Emulsifiers which may be used are ionic and non-ionic emulsifiers or their mixtures. It is preferred to employ non-ionic emulsifiers from the group consisting of ethoxylated vegetable oils or ethoxylated triglycerides, polyethylene oxide/polypropylene oxide block copolymers, polyethylene glycol ethers of linear and branched alcohols, reaction products of fatty acids with ethylene oxide and/or propylene oxide, polyvinyl alcohols, polyvinylpyrrolidones, mixed polymers of polyvinyl alcohol and polyvinyl pyrrolidone, and copolymers of (meth)acrylic acid and (meth)acrylates for the aqueous composition of the present invention.

It is especially preferred to employ, as the at least one non-ionic emulsifier, an ethoxylated vegetable oil or an ethoxylated triglyceride for the aqueous composition. It is very especially preferred to employ, in accordance with the invention, at least one castor oil ethoxylate. The degree of ethoxylation is preferably between 5 and 100, even more preferably between 10 and 50 and most preferably between 20 and 40.

It is further preferred also to employ ionic and zwitter-ionic emulsifiers as coemulsifier in combination with non-ionic emulsifiers for the aqueous composition of the present invention.

Ionic emulsifiers may be selected for example from the group of the alkylsulphosuccinates, alkyl sulphates, alkyl ether sulphates, alkylbenzenesulphonates, sarcosinates, naphthalenesulphonates, alkyl carboxylates, alkyl ether carboxylates, alkyl phosphates, alkyl ether phosphates, amphoacetates and alkylisethionates.

Zwitter-ionic emulsifiers may be selected for example from the group of the amine oxides and betaines.

Preferably, the formulation described additionally comprises at least one non-volatile solvent. Non-volatile solvents which may be used for the present invention are comprehensive and preferably have a boiling point of at least 100° C. or preferably of at least 200° C. and are sparingly soluble in water (less than 1 mol/l and preferably less than 0.1 mol/l). Especially suitable non-volatile solvents for use in the present aqueous composition comprise aromatic hydrocarbons such as, for example, alkylbenzenes or alkylnaphthalines, aliphatic solvents, alcohols, N-alkylpyrrolidones, dimethylamides of fatty acids, vegetable and animal oils, triglycerides and chlorinated hydrocarbons. It is preferred to employ, in accordance with the invention, vegetable oils, animal oils and/or triglycerides as solvents. The term vegetable oils as used in the present context includes oils from all oil-producing plants, such as rapeseed oil, soya oil, palm oil, sunflower oil, cotton oil, corn oil, linseed oil, coconut oil, safflower oil or castor oil. The term animal oil as used in the present context includes oils from oil-producing animals such as tallow oil. Further examples of non-volatile solvents are the transesterification products of these oils, such as alkyl ester, for example rapeseed oil methyl ester or rapeseed oil ethyl ester. Triglycerides may both be obtained from natural oils and be prepared by synthesis. In the synthetic preparation, it is possible to use fractionated fatty acids, obtained from natural oils.

Non-volatile solvents which are especially preferred in accordance with the invention are medium-chain fatty acid esters, in particular triglycerides with $C_4$-$C_{22}$-fatty acids, preferably $C_6$-$C_{14}$-fatty acids and even more preferred with $C_8$-$C_{10}$-fatty acids.

Cyclodextrins which are employed in accordance with the invention may be selected for example from the group of α-cyclodextrins, β-cyclodextrins, γ-cyclodextrins. Cyclodextrins are cyclic oligosaccharides. They are cyclic degradation products of starch and are composed of α-1,4-glycosidically linked glucose molecules (with 6, 7 or 8 sugar units). Cyclodextrins may also be present in modified form. Thus, all primary or secondary hydroxyl groups on the sugar residues may be, for example, alkylated or acetylated.

Means of modifying the alcohols are known to the skilled worker, and many different cyclodextrin derivatives are commercially available.

Preferred in accordance with the invention are β-cyclodextrins and in particular those β-cyclodextrins which are substituted on one or more hydroxyl groups on the cyclodextrin by one O—R or O—C(O)—R group, where R is an optionally substituted $C_{1-6}$-alkyl, an optionally substituted $C_{2-6}$-alkenyl, an optionally substituted $C_{2-6}$-alkynyl, an optionally substituted aryl or heteroaryl group. Preferably, R represents a $C_{1-6}$-alkyl, and even more preferably R represents methyl. Especially preferably is, therefore, the use of methyl-β-cyclodextrins for the aqueous composition according to the invention.

The aqueous composition of the present invention further comprises at least one polymer dispersion. The polymer dispersion is preferably obtainable by polymerization, in water, of a monomer mixture comprising one or more compounds selected among styrene, substituted styrene, acrylonitrile, methacrylonitrile, acrylic ester and (meth)acrylamide in the presence of a hydrocolloid as graft base.

Preferred are polymer dispersions which, after drying, have a glass transition temperature of from 0° C. to 120° C., preferably from 25° C. to 90° C. and especially preferably from 40° C. to 80° C.

The glass transition temperature of the polymers is determined as follows: polymer dispersion which has been left to dry in a DSC pan (drying for 24 hours at room temperature and 0% relative humidity) was determined using the Perkin-Elmer DSC-7 differential scanning calorimeter, equipped with Intracooler, over three heating/cooling cycles (−100° C. to +150° C., heating rate 20K/min, cooling rate 320K/min, nitrogen flushing with a gas flow rate of 30 ml/min). The glass transition temperature was evaluated at half the level of the glass transition. The minimum film-formation temperature (MFT) was determined using the Thermostair® temperature gradient testing apparatus (Coesfeld Messtechnik GmbH) as specified in DIN ISO 2115.

Especially preferred are polymer dispersions which are obtainable by polymerization of a monomer mixture comprising an optionally substituted styrene and a $C_1$-$C_4$-alkyl (meth)acrylate.

Such grafted polymer dispersions are obtainable for example by radical-initiated emulsion copolymerization of ethylenically unsaturated monomers in the presence of starch, characterized in that the ethylenically unsaturated monomers employed are (a) 30 to 60% by weight of at least one optionally substituted styrene,
(b) 60 to 30% by weight of at least one $C_1$-$C_{18}$-alkyl (meth)acrylate,
(c) 0 to 10% by weight of other ethylenically unsaturated copolymerizable monomers,
the starch (d) employed is 10 to 40% by weight of degraded starch with a molar weight=500 to 10 000, the total of (a)+(b)+(c)+(d) being 100%,
and the free-radical-initiator employed for the radical-initiated emulsion polymerization is a graft-active, water-soluble redox system.

Substituted styrenes which are preferably employed are α-methylstyrene, vinyltoluene or their mixtures. It is especially preferred to employ unsubstituted styrene.

To prepare the polymer dispersion, at least one $C_1$-$C_{18}$-alkyl (meth)acrylate, preferably a $C_1$-$C_4$-alkyl (meth)acrylate, is employed as monomers of b). Those which are preferably employed are methyl acrylate, methyl methacrylate, ethyl acrylate, ethyl methacrylate, propyl acrylate, propyl methacrylate, n-, iso- and tert-butyl acrylate, n-, iso- and tert-butyl methacrylate, hexyl acrylate, hexyl methacrylate, ethylhexyl acrylate, stearyl acrylate and stearyl methacrylate. Those which are especially preferably employed are n-butyl acrylate or binary mixtures which comprise between 10 and 90% by weight of n-butyl acrylate. Those which are very especially preferably employed are mixtures of n-butyl acrylate and tert-butyl acrylate.

To prepare the polymer dispersion, at least one non-ionic, ethylenically unsaturated monomer which differs from a) and b) are employed as monomers of group c). Those which are preferably employed are nitriles such as, for example, acrylonitrile or methacrylonitrile, amides such as, for example, acrylamide, methacrylamide or n-methylolacrylamide, vinyl compounds such as, for example, vinyl acetate or vinyl propionate, dienes such as, for example, butadiene or isoprene and also esters of acrylic acid or methacrylic acid and at least one ethylene oxide unit such as, for example, hydroxyethyl methacrylate or diethylene glycol monomethacrylate.

An especially preferred embodiment of the invention is the use of polymer dispersions obtainable by polymerization of a monomer mixture in the presence of a hydrocolloid as graft base.

Hydrocolloids are macromolecular, hydrophilic substances which are soluble or dispersible and swellable in water, giving rise to viscous solutions, gels or stabilized systems such as, for example, agar, carrageenan, xanthan, gellan, galactomannans, gum Arabic, tragacanth, karaya, curdlan, beta-glucan, alginates, mannans, chitosan, celluloses, proteins, gelatin, pectin, starch, and their modified and/or degraded (for example hydrolysed and/or oxidized) forms, and synthetic water-soluble polymers. Preferred as hydrocolloid is starch, which is degraded oxidatively during polymerization.

The grafted polymer dispersions have a particle size of below 100 nm, preferably 50 to 90 nm.

Besides the abovementioned components, the compositions according to the invention optionally comprise
   a thickener (optionally including thickening activator),
   a preservative,
   an antifoam,
   one or more acids or bases in such an amount as to adjust to the pH of the mixture in a targeted manner, or to activate thickener, and
   further components (such as, for example, a wetting agent) for optimizing the use properties of the formulation.

Suitable thickeners are all the substances which act as thickeners and which can conventionally be employed for this purpose in agrochemical compositions. Preferred are inorganic particles such as carbonates, silicates and oxides, and also organic substances such as urea/formaldehyde condensates. Examples which may be mentioned are kaolin, rutile, silicon dioxide, what is known as highly-dispersed silica, silica gels, and also natural and synthetic silicates, further talc. Thickeners which can furthermore be employed are synthetic thickeners such as polyacrylate thickeners (for example Carbopol® and Pemulen® thickeners from Lubrizol, Cleveland, USA), biological thickeners such as polysaccharide (for example Kelzan® S, xanthan gum, or further hydrocolloids from CP Kelco, Atlanta, USA) and inorganic thickeners (for example layer silicates such as kaolin, montmorillonite and laoponite).

Preservatives which are suitable are all substances which can be employed for this purpose in agrochemical compositions of this type. Examples which may be mentioned are Preventol® (Lanxess AG) and Proxel® (Arch Chemival, Inc.).

Antifoams which are suitable are all substances which can be employed for this purpose in agrochemical compositions. Silicone oils and magnesium stearate are preferred.

The amount of the at least one insecticide in the aqueous compositions according to the invention can be varied within a wide range. For an RTU (that is to say, spray mixture) used, for example between 0.001 and 5% by weight, preferably between 0.01 and 2.5% by weight, especially preferably between 0.05 and 1.0% by weight and even more preferably between 0.05 and 0.5% by weight.

The amount of the at least one cyclodextrin in the aqueous compositions according to the invention is, for example, for an RTU application, for example between 0.01 and 15% by weight, preferably between 0.1 and 10% by weight, especially preferably between 0.5 and 5.0% by weight.

The amount of the at least one polymer dispersion in the aqueous compositions according to the invention is for an RTU application for example between 0.1 and 10% by weight, preferably between 0.25 and 5.0% by weight, especially preferably between 0.5 and 2.5% by weight. The stated quantities indicate the fraction based on the solids content. The polymers are frequently synthesized or offered on the market and employed for the preparation of the compositions according to the invention as aqueous dispersions.

The amount of water in the aqueous composition in an RTU formulation is, for example, between 70 and 99.89% by weight, preferably between 90 and 98% by weight.

The optional amount (which is present in a preferred variant) of the at least one non-ionic emulsifier in the aqueous compositions according to the invention is, for example, for an RTU application e.g. between 0.01 and 5% by weight, preferably between 0.05 and 2.5% by weight, especially preferably between 0.1 and 1% by weight and even more preferably between 0.1 and 0.5% by weight.

The optional amount (which is present in a preferred variant) of the at least one non-volatile solvent in the aqueous compositions according to the invention is, for example, for an RTU application e.g. between 0.001 and 1% by weight, preferably between 0.005 and 0.5% by weight, especially preferably between 0.01 and 0.1% by weight.

All the percentages by weight of the above-described components, which refer to the aqueous composition, give in total a maximum of 100%.

The amounts in the aqueous compositions according to the invention for a concentrate should follow the instructions for an RTU formulation, taking into consideration the dilution rate for preparing the spray mixture. The amount of the at least one insecticide in the aqueous compositions according to the invention in the form of a concentrate can be varied within a wide range as desired, for example between 1 and 10% by weight, preferably between 2.0 and 5.0% by weight.

The amount of the at least one cyclodextrin in the aqueous compositions according to the invention is, for example, for a concentrate, e.g. between 5.0 and 50% by weight, preferably between 10 and 45% by weight, especially preferably between 20 and 40% by weight.

The amount of the at least one polymer dispersion in the aqueous compositions according to the invention is for a concentrate for example between 5.0 and 30% by weight, preferably between 8.0 and 25% by weight, especially preferably between 10 and 20% by weight. The stated quantities indicate the amount based on the solids content.

The polymers are frequently synthesized or offered on the market and employed for the preparation of the compositions according to the invention as aqueous dispersions.

The amount of water in the aqueous composition in a concentrate is, for example, between 0 and 89% by weight, preferably between 0 and 50% by weight.

The optional amount (which is present in a preferred variant) of the at least one emulsifier in the aqueous compositions according to the invention is, for example, for a concentrate for example between 0.1 and 20% by weight, preferably between 1.0 and 15% by weight, especially preferably between 2.0 and 10% by weight and even more preferably between 3.0 and 8.0% by weight.

The optional amount (which is present in a preferred variant) of the at least one non-volatile solvent in the aqueous compositions according to the invention is, for example, for a concentrate e.g. between 0.05 and 10% by weight, preferably between 0.5 and 7.5% by weight, especially preferably between 1.0 and 5.0% by weight.

All the percentages by weight of the above-described components, which refer to the aqueous composition, give in total a maximum of 100%.

An especially preferred embodiment of the invention relates to the above-described composition according to the invention, where the ratio of the amounts by weight of the at least one polymer dispersion to the at least one cyclodextrin is between 0.5:1 and 5:1 and even more preferably between 0.5:1 and 2:1. The quantities stated indicate the amount based on the solids content.

An especially preferred embodiment of the invention relates to the above-described composition according to the invention, where the ratio of the amounts by weight of the at least one insecticide to the at least one cyclodextrin is between 0.01:1 and 1:1, preferably between 0.05:1 and 0.5:1. The quantities stated indicate the amount based on the solids content.

The preparation of the aqueous composition according to the invention is carried out such that the components are mixed with each other in the ratios which are desired in each case. The sequence in which the components are mixed with one another is of no importance; however, it is preferred to first mix the at least one insecticide with at least one non-ionic emulsifier and with at least one non-volatile solvent to give an emulsion concentrate before adding the other components.

The formulations according to the invention can be used successfully for destroying harmful arthropods or nuisance arthropods, in particular arachnids and insects.

The arachnids include mites (for example *Sarcoptes scabiei, Dermatophagoides pteronyssinus, Dermatophagoides farinae, Dermanyssus gallinae*, Acarus siro) and ticks (for example *Ixodes ricinus, Ixodes scapularis, Argas reflexus, Ornithodorus moubata, Rhipicephalus (Boophilus) microplus, Amblyomma hebraeum, Rhipicephalus sanguineus*).

The sucking insects include essentially the mosquitos (for example *Aedes aegypti, Aedes vexans, Culex quinquefasciatus, Culex tarsalis, Anopheles albimanus, Anopheles stephensi, Mansonia titillans*), the moth gnats (for example *Phlebotomus papatasii*), gnats (for example *Culicoides furens*), buffalo gnats (for example *Simulium damnosum*), stinging flies (for example *Stomoxys calcitrans*), Tsetse flies (for example *Glossina morsitans morsitans*), horse flies (for example *Tabanus nigrovittatus, Haematopota pluvialis, Chrysops caecutiens*), true flies (for example *Musca domestica, Musca autumnalis, Musca vetustissima, Fannia canicularis*), flesh flies (for example *Sarcophaga carnaria*), myiasis-causing flies (for example *Lucilia cuprina, Chrysomyia chloropyga, Hypoderma bovis, Hypoderma lineatum, Dermatobia hominis, Oestrus ovis, Gasterophilus intestinalis, Cochliomyia hominivorax*), bugs (for example *Cimex lectularius, Rhodnius prolixus, Triatoma infestans*), lice (for example *Pediculus humanis, Haematopinus suis, Damalina ovis*), fleas (for example *Pulex irritans, Xenopsylla cheopis, Ctenocephalides canis, Ctenocephalides felis*) and sand fleas (*Tunga penetrans*).

The biting insects include essentially cockroaches (for example *Blattella germanica, Periplaneta americana, Blatta orientalis, Supella longipalpa*), beetles (for example *Sitiophilus granarius, Tenebrio molitor, Dermestes lardarius, Stegobium paniceum, Anobium punctatum, Hylotrupes bajulus*), termites (for example *Reticulitermes lucifugus*), ants (for example *Lasius niger, Monomorium pharaonis*), wasps (for example *Vespula germanica*) and larvae of moths (for example *Ephestia elutella, Ephestia cautella, Plodia interpunctella, Hofmannophila pseudospretella, Tineola bisselliella, Tinea pellionella, Trichophaga tapetzella*).

Preferably, the substances according to the invention are employed against insects, mainly from the orders Diptera and Dictyoptera.

The aqueous composition can be sprayed in any customary manner, for example by hand-operated or electrical sprayers.

In general, the active substance is applied at an application rate of from 1 to 1000 mg/m$^2$, preferably at a concentration of 1 to 500 mg/m$^2$, especially preferably at a concentration of 5 to 250 mg/m$^2$ and very especially preferably at a concentration of from 10 to 100 mg/m$^2$.

The compositions according to the invention can be applied to any surface inside buildings or in the open, for example wallpaper, concrete, render, ashlar, timber (treated and untreated), ceramic (glazed and unglazed), straw or thatch, brick (untreated, lime washed, painted), clay minerals (for example terracotta), chalky, limy, gypsiferous, cement-containing and loamy surfaces. The application to non-porous surface such as, for example, tiles, is preferred.

PREPARATION EXAMPLES

Example 1: Preparation of the Polymer Dispersion

In a flask equipped with stirrer, reflux condenser and heating jacket, 124.5 g of oxidatively degraded potato starch are dispersed under nitrogen in 985 g of deionized water and dissolved by warming. In succession, 42.7 g of a 1% strength iron(II) sulphate solution and 116 g of a 3% strength hydrogen peroxide solution are added, and the mixture is stirred for 15 min at 86° C. After 15 minutes, the following two metering solutions are metered in simultaneously, but separately, with constant dosing rate within 90 min at 86° C.:
1) 321 g of a mixture of styrene, n-butyl acrylate and tert-butyl acrylate
2) 93.7 g of a 3% strength hydrogen peroxide solution.

After all the solutions have been metered in, stirring is continued for 15 min at 86° C., and 2 g of t-butyl hydroperoxide are then added to let the mixture after-react. After a further 60 min at 86° C., the mixture is cooled to room temperature, 10 g of a 10% strength solution of EDTA in the form of the tetrasodium salt are added, and a pH of 6.5 is adjusted with 13 g of a 10% strength sodium hydroxide solution. The mixture is passed through a 100 μm filter cloth, giving a finely divided dispersion with a solids content of 24.0% by weight.

The ratio between styrene, n-butyl acrylate and tert-butyl acrylate can be varied, depending on the desired polymer properties (glass transition temperature, minimum film-forming temperature). The suitable ratio can be determined experimentally following the above protocol.

A polymer dispersion (hereinbelow termed PD-SACP) as per the above protocol was prepared. The monomer composition was adjusted such that the polymer had a glass transition temperature of between 45 and 55° C. and a minimum film-forming temperature of 44° C. The turbidity value of the dispersion, diluted to 0.025% by weight, was E=0.02 (535 nm, 1 cm cell). The dilution medium used was demineralized water. However, comparative measurements with a 50 mM solution of $CaCl_2$ solution gave identical absorbance values.

Example 2: Preparation of the Composition According to the Invention

Various spray solutions with 0.1% transfluthrin were made up with different concentrations of methyl-β-cyclodextrin and of polymer dispersion (PD-SACP), prepared as per the above preparation example.

To this end, the active substance transfluthrin is molten and mixed with Miglyol 812 (a caprylic/capric triglyceride) and the emulsifier Lucramol CO 30 (a fatty acid polyethylene glycol ether ester from Levaco Chemicals GmbH) to give a homogeneous preliminary solution.

The methyl-β-cyclodextrin Cavasol W7M from Wacker and the biocide Proxel GXL 20% from Arch are added to the demineralized water and dissolved with stirring. After the dissolution, the polymer dispersion PD-SACP and the active-substance-containing preliminary solution are stirred in to give a homogeneous dispersion.

The table which follows shows an example of the formulations which were made up:

| Component | % by weight |
|---|---|
| TRANSFLUTHRIN | 0.10 |
| LUCRAMUL CO 30 | 0.165 |
| MIGLYOL 812 N | 0.066 |
| PROXEL GXL 20% | 0.10 |
| CAVASOL W7 M | 1.00 |
| PD-SACP | 4.00 |
| DEMINERALIZED WATER | 94.57 |

The variation of the formulas refers to the variation of the concentration in % of Cavasol W7M and PD-SCAP, the water component is varied to make up the balance to 100%. The concentration of the further components is constant in each formulation variant.

The following variants were produced for the biological testing:

| Formulation | PD-SACP in % by weight | Cavasol W7M in % by weight |
|---|---|---|
| A | 0 | 0 |
| B | 2 | 0 |
| C | 0 | 6 |
| D | 4 | 3 |
| E | 4 | 0 |
| F | 0 | 1 |
| G | 0 | 3 |
| H | 4 | 1 |
| I | 2 | 1 |
| J | 2 | 0.5 |

Biological Activity

These solutions were sprayed on to an unglazed tile at an application rate of 25 mg of transfluthrin per $m^2$, using a fan nozzle. The application rate for the spray solutions was therefore 50 ml/$m^2$.

The treated surfaces were subsequently stored and tested after 9 weeks' storage.

To this end, *Aedis aegypti* mosquitos were placed centrally on the tile (20 animals per tile) and covered with an aluminium (diameter 10.5 cm) ring provided with gauze. The exposure time was either 5 or 15 minutes. After the exposure time, the mosquitos were removed from the treated surface, and the knock-down effect (insects lying on their backs) and the mortality (after 24 hours) were determined.

At an exposure time of 5 minutes, the mean knock-down activity was calculated as the mean after 5 and 15 minutes; at an exposure time of 15 minutes the mean knock-down activity was calculated after 15 and 30 minutes.

Each test consisted of 3 replications from which the mean was formed.

During the storage of the tile and the biological testing, the temperature was 25-26° C. with an atmospheric humidity of approximately 60% (±10%).

The results for the mean knock-down activity and the mortality is shown in Table 1.

TABLE 1

| | Nine weeks after application to unglazed tiles (*Aedes aegypti*) | | | |
|---|---|---|---|---|
| | Exposure time 15 minutes | | Exposure time 5 minutes | |
| Formulation | % knock-down | % mortality | % knock-down | % mortality |
| A | 0 | 0 | 0 | 0 |
| B | 3 | 8 | 1 | 3 |
| C | 67 | 70 | 6 | 2 |
| D | 47 | 42 | 12 | 21 |
| E | 75 | 38 | 20 | 7 |
| F | 100 | 73 | 20 | 7 |
| G | 97 | 71 | 39 | 32 |
| H | 100 | 68 | 95 | 43 |
| I | 100 | 98 | 100 | 72 |

It is surprising that, as the result of the combination of selected quantitative ratios of PD-SACP and Cavasol W7M in the formulation, the long-term activity can be improved markedly. It is furthermore surprising that this improvement is observed in this case only at a medium concentration of Cavasol W7M.

The same experiment was also carried out using *Anopheles funestus* mosquitos. The results for the mortality is shown in Table 2 and Table 3 at different points in time.

TABLE 2

| | Four weeks after application to unglazed tiles (*Anopheles funestus*) Exposure time 15 minutes |
|---|---|
| Formulation | % mortality |
| A | 15 |
| B | 60 |
| I | 82 |
| J | 90 |

TABLE 3

| Formulation | Eight weeks after application to unglazed tiles (Anopheles funestus) Exposure time 30 minutes % mortality |
|---|---|
| A | 37 |
| B | 47 |
| I | 83 |
| J | 77 |

It can be seen from Table 2 and 3, too, that as the result of the combination of PD-SACP and Cavasol W7M in the formulation, the long-term activity can be improved markedly.

The invention claimed is:

1. A composition, comprising
at least one insecticide which has a vapour pressure of at least 0.001 mPa at 20° C.,
at least one cyclodextrin,
at least one polymer dispersion,
at least one non-volatile solvent, and
water,
wherein the ratio of the amounts by weight of the at least one polymer dispersion to the at least one cyclodextrin being between 0.4:1 and 10:1, in each case based on the solids content, and the at least one non-volatile solvent is selected from the group consisting of aromatic hydrocarbons, aliphatic solvents, N-alkylpyrrolidones, dimethylamides of fatty acids, vegetable or animal fats, triglycerides, and chlorinated hydrocarbons.

2. The Composition according to claim 1, wherein the at least one insecticide is selected from the group consisting of esbiothrin, lambda-cyhalothrin, D-allethrin, S-bioallethrin, prallethrin, pyrethrum, and an insecticide which has a polyfluorobenzyl substituent.

3. The Composition according to claim 1, wherein the composition comprises at least one emulsifier.

4. The Composition according to claim 3, wherein the at least one emulsifier is a non-ionic emulsifier selected from the group consisting of ethoxylated vegetable oils or ethoxylated triglycerides, polyethylene oxide/polypropylene oxide block copolymers, polyethylene glycol ethers of linear and branched alcohols, reaction products of fatty acids with ethylene oxide and/or propylene oxide, polyvinyl alcohols, polyvinylpyrrolidones, mixed polymers of polyvinyl alcohol and polyvinyl pyrrolidone, and copolymers of (meth)acrylic acid and (meth)acrylates.

5. The Composition according to claim 1, wherein the at least one non-volatile solvent is the vegetable oil, the animal oil and/or the triglyceride.

6. The Composition according to claim 1, wherein the at least one insecticide is first mixed with at least one non-ionic emulsifier and with the at least one non-volatile solvent to give an emulsion concentrate.

7. The Composition according to claim 1, wherein the at least one cyclodextrin is a beta-cyclodextrin.

8. The Composition according to claim 1, wherein the at least one cyclodextrin is a methyl-beta-cyclodextrin.

9. The Composition according to claim 1, wherein the at least one polymer dispersion is obtained by polymerization, in water, of a monomer mixture comprising one or more compounds selected among styrene, substituted styrene, acrylonitrile, methacrylonitrile, acrylic ester and (meth)acrylamide in the presence of a hydrocolloid as graft base.

10. The Composition according to claim 9, wherein the at least one polymer dispersion is obtained by radical-initiated emulsion copolymerization of ethylenically unsaturated monomers in the presence of starch and water, wherein the ethylenically unsaturated monomers employed are
(a) 30 to 60% by weight of at least one optionally substituted styrene,
(b) 60 to 30% by weight of at least one C1-C4-alkyl (meth)acrylate,
(c) 0 to 10% by weight of other ethylenically unsaturated copolymerizable monomers,
the starch (d) employed is 10 to 40% by weight of degraded starch with a molar weight Mn=500 to 10 000, the total of (a)+(b)+(c)+(d) being 100%,
and the free-radical-initiator employed for the radical-initiated emulsion polymerization is a graft-active, water-soluble redox system.

11. The Composition according to claim 1, which the composition is a concentrate, wherein the following components are present:
the at least one insecticide in an amount of between 1 and 10% by weight,
the at least one cyclodextrin in an amount of between 5 and 50% by weight,
the at least one polymer dispersion in an amount of between 5 and 30% by weight, where the stated quantity is based on the solids content of the polymer, and
the water in an amount of up to 89% by weight.

12. A Spray mixture, comprising the Composition according to claim 1, which the spray mixture can be prepared by dilution with water.

13. The Spray mixture according to claim 12, wherein the following components are present:
the at least one insecticide in an amount of between 0.001 and 5% by weight,
the at least one cyclodextrin in an amount of between 0.01 and 15% by weight,
the at least one polymer dispersion in an amount of between 0.1 and 10% by weight, where the stated quantity is based on the solids content of the polymer, and
the water in an amount of between 70 and 99.89% by weight.

14. A method for controlling pests, comprising applying the composition according to claim 1 or the Spray mixture of claim 12, to a non-porous surface, wherein the composition is not applied to the animal or human body for therapeutical treatment.

15. The Composition according to claim 1, wherein the at least one insecticide is selected from the group consisting of transfluthrin, metofluthrin, momfluorothrin, meperfluthrin, dimefluthrin, fenfluthrin, profluthrin, tefluthrin, and heptafluthrin.

16. The Composition according to claim 4, wherein the at least one non-ionic emulsifier is a castor oil ethoxylate.

17. The method according to claim 14 to control mosquitos, wherein the composition according to claim 1 or the Spray mixture of claim 12 is applied to tile.

18. The Composition according to claim 1, which the composition is a concentrate, wherein the following components are present:
the at least one insecticide in an amount of between 2 and 5% by weight,
the at least one cyclodextrin in an amount of between 10 and 45% by weight, the at least one polymer dispersion in an amount of between 8 and 25% by weight, where the stated quantity is based on the solids content of the polymer, the at least one non-volatile solvent in an amount of between 0.05 and 10% by weight, and the water in an amount of up to 89% by weight.

19. The spray mixture according to claim 12, wherein the following components are present:

the at least one insecticide in an amount of between 0.01 and 2.5% by weight, the at least one cyclodextrin in an amount of between 0.1 and 10% by weight, the at least one polymer dispersion in an amount of between 0.25 and 5% by weight, where the stated quantity is based on the solids content of the polymer, the at least one non-volatile solvent in an amount of between 0.005 and 0.5% by weight, and the water in an amount of between 90 and 98% by weight.

20. The Composition according to claim 1, wherein the ratio of the amounts by weight of the at least one polymer dispersion to the at least one cyclodextrin being between 0.5:1 and 5:1, and/or the ratio of the amounts by weight of the at least one insecticide to the at least one cyclodextrin is between 0.01:1 and 1:1, in each case based on the solids content.

* * * * *